United States Patent [19]
Vallomy

[11] Patent Number: 5,400,358
[45] Date of Patent: Mar. 21, 1995

[54] CONTINUOUS SCRAP PREHEATING
[75] Inventor: John A. Vallomy, Charlotte, N.C.
[73] Assignee: Consteel, S.A., Geneva, Switzerland
[21] Appl. No.: 959,733
[22] Filed: Oct. 13, 1992
[51] Int. Cl.⁶ ............................................. F27D 13/00
[52] U.S. Cl. .................................... 373/80; 373/8; 75/10.63; 110/203; 432/9; 432/37
[58] Field of Search ................... 373/8, 9, 79, 80, 123, 373/124, 18, 34; 75/10.63, 10.66, 46; 432/8, 59, 9, 37; 110/203–205

[56] References Cited
U.S. PATENT DOCUMENTS

| | | | |
|---|---|---|---|
| 1,299,337 | 4/1919 | Heckenbleikner | 373/80 |
| 3,163,520 | 12/1964 | Collin et al. | 373/79 |
| 4,375,958 | 3/1983 | Date et al. | 432/9 |
| 4,506,370 | 3/1985 | Yoshimatsu | 373/8 |
| 4,543,124 | 9/1985 | Vallomy | 75/46 |
| 4,609,400 | 9/1986 | Vallomy | 75/46 |
| 4,715,810 | 12/1987 | Ramsey et al. | 432/8 |

Primary Examiner—Bruce A. Reynolds
Assistant Examiner—Tu Hoang
Attorney, Agent, or Firm—Ralph H. Dougherty

[57] ABSTRACT

A method and apparatus for reducing the production or emission of noxious gases while continuously preheating a mixture of iron-bearing scrap charge materials for an electric steelmaking furnace operation with off-gas from, the furnace, including provision for controlled combustion within the preheating chamber. Removed gases are then treated by thermal incineration of combustible residual matter before release into the atmosphere to insure that no noxious gases are emitted.

29 Claims, 3 Drawing Sheets

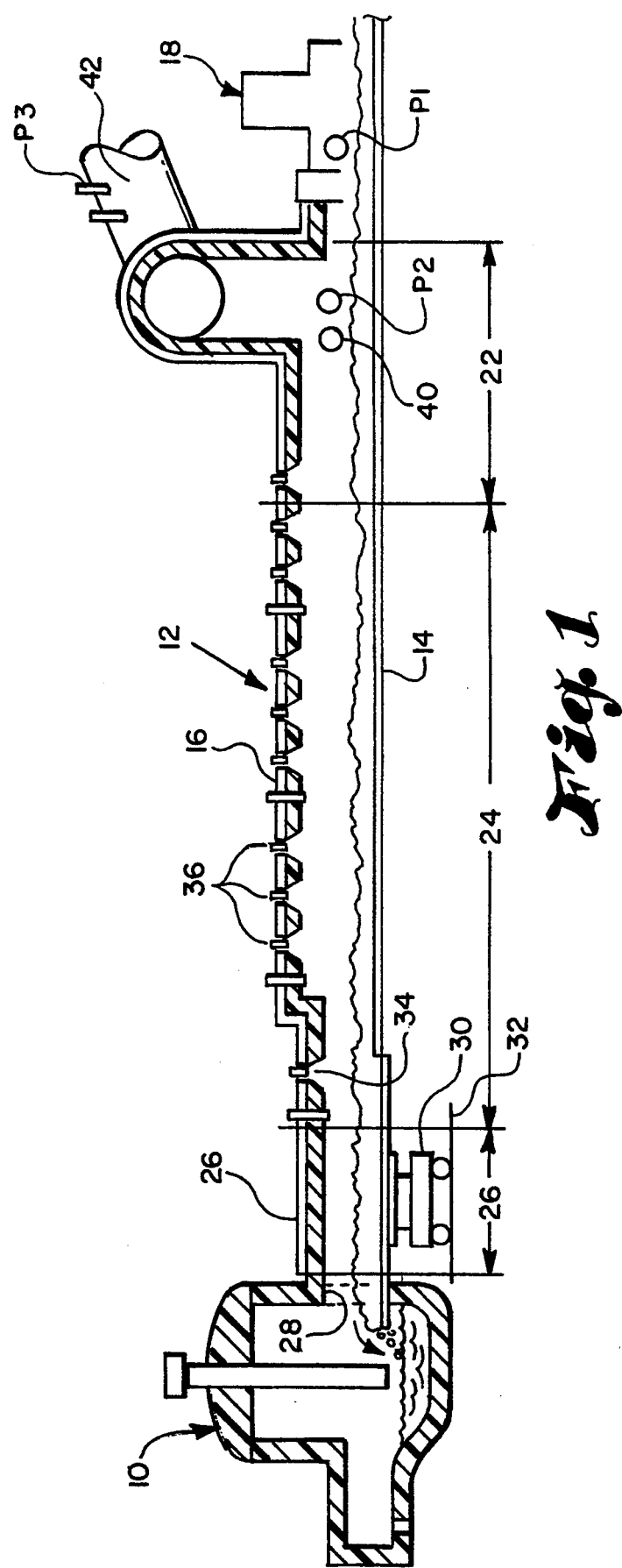

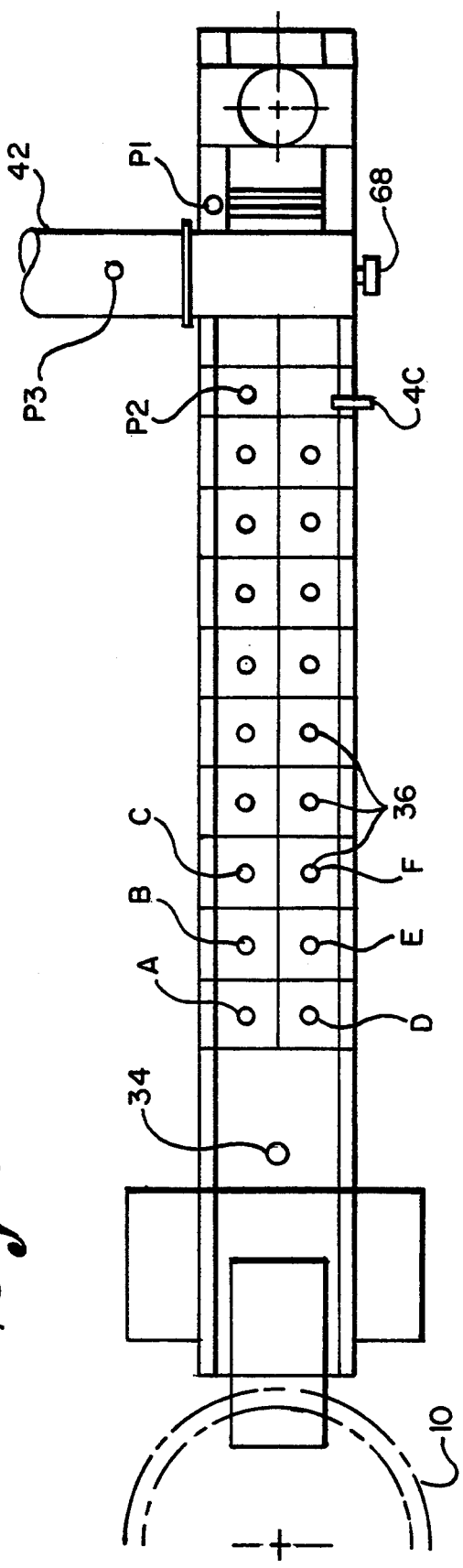

CONTINUOUS SCRAP PREHEATING

BACKGROUND OF THE INVENTION

This invention relates to the continuous preheating of a principally metallic charge to form a molten steel product. More particularly, it relates to continuous preheating of organic compound contaminated charge materials for continuous steelmaking in an associated electric arc furnace (EAF) which reduces noxious emissions generated by the furnace. Some regions of the world have very strict emission standards. The present invention address the problem steelmaking facilities have in complying with these standards.

Continuous steelmaking is particularly advantageous in those regions where there is a concentration of production of, or ready availability of scrap and/or direct reduced iron (DRI), and where electric energy is both available and economical.

Non-metallics from metal-containing charge materials often cause environmental problems, particularly when burned at low temperatures, which results in incomplete combustion. Under such conditions, the electric arc steelmaking furnace produces noxious emissions, including dioxins. These dioxins form in the furnace or in dust collection ducts from combustion of plastics from pipes and cars, synthetic fibers, paints, cutting oils from turnings, and the like. Dioxins form at temperatures between about 300° and 520° C., with the most favorable temperature for forming such compounds being about 420° to 470° C. Dioxins generally form in the presence of chlorine. The reaction is catalyzed by the presence of copper or other catalyst. In general, the temperature required for dioxin creation is from about 320° to 520° C. Dioxins form readily when combustion takes place at low temperatures. The use of chlorinated compounds in iron and steel processes and recycled scrap material contaminated with cutting oils and plastics containing chlorine, such as PVC, provides all the factors required for the formation of the chlorinated aromatic compounds polychlorinated dibenzo dioxins (PCDD) and polychlorinated dibenzo furans (PCDF).

Such harmful compounds are not produced during continuous scrap preheating and feeding in the present process, because the organic matter in the scrap charge is combusted at high temperatures before it reaches the furnace, and the atmosphere within the preheater is carefully controlled. The incineration chamber following the preheater provides sufficiently high temperature, sufficient turbulence, and an excess of oxygen which results in dioxins and precursors being destroyed. If the destruction of dioxins at this stage is complete, formation later on in the system is not possible.

Historically, the operation of an electric arc steelmaking furnace has been an intermittent operation, wherein the sequence followed is: charging of steel scrap and/or direct reduced iron, pig iron, slag formers and alloying elements; ignition or establishment of an electric arc between the electrodes in the furnace to create melting conditions for melting the charge and forming a molten metal bath covered by a molten slag; refining for a period of time during which the molten metal portion of the bath is refined to form steel having a desired composition and quality; and periodically raising the electrodes to remove them from contact with the bath and interference with the tapping procedure; and then tapping the molten metal. In addition, slag can be removed by a deslagging, or slag-off, operation as required.

The present invention is particularly well suited for use in the continuous steelmaking process described in my U.S. Pat. Nos. 4,543,124 and 4,609,400, which are incorporated herein by reference.

SUMMARY OF THE INVENTION

The present invention is a method and apparatus for continuously preheating charge materials for the continuous refining of steel in an associated steelmaking furnace. Iron-bearing scrap in shredded, sheared or granular form, direct reduced iron, commercial scrap, or a mixture thereof, generally containing organic materials or compounds, form the principal part of the charge, which is passed continuously through a preheating chamber. Heat is provided by chemical and sensible heat from the off-gas from a steelmaking furnace, preferably an electric arc furnace, provided sufficient oxygen is injected into the furnace to create sufficient carbon monoxide (CO) in the furnace off-gas to achieve the desired preheating temperature of the scrap from combustion of the hot CO. Oxygen is provided by injection of combustion air into the scrap preheater, as required. If insufficient oxygen is injected into the furnace to provide the necessary heat for preheating the scrap to the desired temperature, additional heat is provided from available fuel through burners in the preheater hood whereby the heat obtained from the carbon monoxide from the furnace is augmented to create sufficient combustion gas to achieve the desired scrap preheating temperature.

Air may be used to cool the conveyor during preheating to preheat the air for injection into the preheater, and to cool the portion of the conveyor in contact with the charge. The process utilizes the carbon monoxide generated from oxygen injection into the molten metal bath within the associated electric arc steelmaking furnace, or other available fuel, or a combination thereof, as the source of heat for scrap preheating in the preheating chamber. The pre-heating chamber has an associated secondary gas-treating chamber at the material entry end to ensure thermal incineration of any residual combustible matter. The organic matter in the scrap charge is combusted at high temperatures and the atmosphere within the preheater is carefully controlled, preventing or limiting the formation of noxious emissions, such as dioxins or furans, among others, in the preheater. By providing excess oxygen of 3-4% with 2 seconds residence time at 900° to 1100° C., in the associated gas treating chamber, any furans and dioxins are incinerated in the gas removed from the preheater.

OBJECTS OF THE INVENTION

It is the principal object of this invention to provide a method and apparatus for the continuous preheating of charge materials to an electric steelmaking furnace.

It is also an object of this invention to provide a method and apparatus which will preheat a desired quantity of scrap at a controlled rate, while complying with local environmental regulations.

It is also an object of this invention to provide a method and apparatus for reducing noxious emissions from an associated EAF during continuous preheating of charge materials.

It is another object of this invention to provide an efficient continuous charge preheater which will utilize off-gases from the associated steelmaking furnace to provide a portion of the heat required for preheating.

It is another object of this invention to provide apparatus for preheating a furnace charge, which will simultaneously reduce or eliminate noxious gases.

BRIEF DESCRIPTION OF THE DRAWINGS

The foregoing and other objects will become more readily apparent by reference to the following detailed description and the appended drawings, in which:

FIG. 1 is an elevational cross section of the invented apparatus, including the furnace connection.

FIG. 2 is a top view of the apparatus for preheating charge materials in a continuous steelmaking operation, in accordance with the invention.

FIG. 3 is a vertical cross section of the apparatus of FIG. 1 as utilized in the present invention.

DETAILED DESCRIPTION

Figure 4:
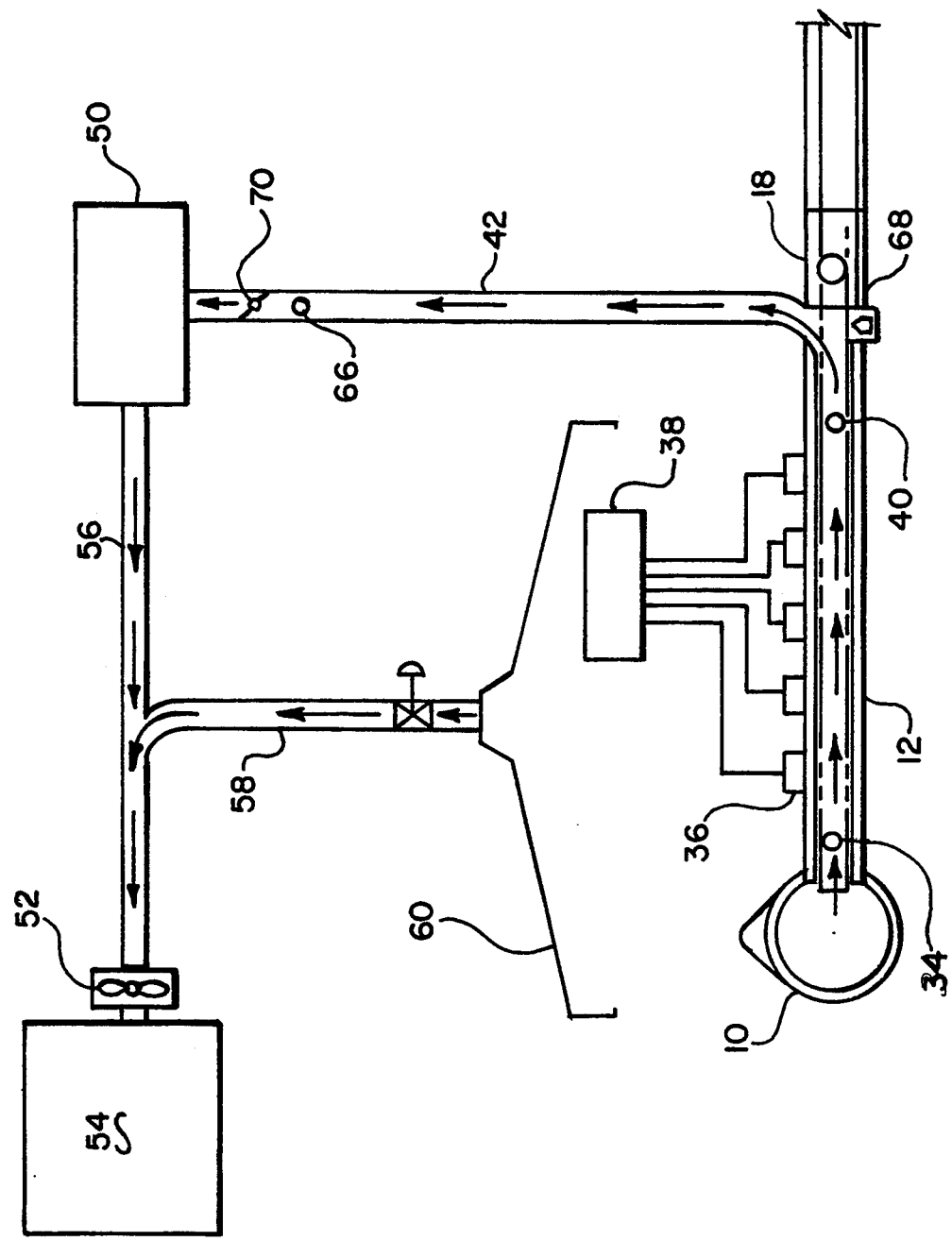
FIG. 4 is a schematic representation of the entire apparatus for preheating charge materials and preventing emission of noxious gases in a continuous steelmaking operation, in accordance with the invention.

Referring now to the drawings, an electric arc steelmaking furnace 10 has an associated elongated preheating chamber 12, preferably a vibrating channel, for introducing charge materials, both metallics and non-metallics, into the furnace. The furnace 10, although shown as a three-phase electric arc furnace, alternatively can be a direct current electric furnace, a plasma furnace or an induction furnace. The chamber 12 has an elongated support 14 covered by a mating elongated hood 16, preferably refractory-lined, and generally in accordance with my U.S. Pat. No. 4,609,400, which is incorporated herein by reference. The heating chamber 12 has a dynamic seal 18 at the charge material entry end, and from the charge material entry end the heating chamber includes sequentially a gas transition section or zone 22, one or more heating sections or zones 24, and a material discharge section 26. Furnace 10 has an off-gas exit orifice 28. The discharge section of the chamber is mounted on a connecting car 30 for telescoping axial movement into engagement with the furnace opening 28 which effectively seals the stationary chamber 12 to the furnace 10, which may be tiltable. The connecting car feeds the scrap from the heater to the furnace at the proper location within the furnace. The connecting car is advantageously mounted on a track 32.

Furnace off-gas from furnace 10, the temperature of which is usually about 1300° C., enters the refractory lined scrap heating chamber 12 through furnace opening 28. The furnace off-gas provides heat to the charge in the scrap heater chamber in two manners, by both the sensible and chemical heat contained in the furnace off-gas. Near the material discharge end of the heating chamber 12, a safety burner 34 is mounted for igniting combustible gases which have not reached the temperature of combustion. The safety burner is used only when the temperature within the heating zone 24 is below the flash point temperature of the furnace off gas.

Heating sections A, B, C, etc, are provided with air injectors 36 in the respective hood 16 of each section. Any desired number of heating sections may be employed, and they may be of the same or varying lengths. The air injectors direct air or oxygen-enriched air for gas combustion downwardly against the scrap beneath them. As shown in FIG. 2, multiple air injectors or ports 36, may be provided within the hood of each heating section for good control of the combustion air injection. Air injectors are used if there is sufficient carbon monoxide in the furnace gas produced to preheat the scrap to the desired temperature. Alternatively, these hoods may be provided with burners in addition to air injectors. The steelmaking furnace can operate without oxygen injection, in which case little or no CO is produced to use as fuel in the scrap heater. In such case, burners utilizing available fuel are utilized instead of air injectors to produce the desired scrap heating in the heating zone 24.

Combustion air distribution is controlled to obtain even combustion throughout the preheating chamber. An oxygen sensor 40 which is located in the gas transition section 22 of the elongated scrap preheating chamber 12 determines the amount of oxygen in the off-gas about to exit the chamber 12. This sensor 40 controls the introduction of air through injectors 36 to allow the operation to progressively change the atmosphere within the scrap heating chamber from reducing at the mixture discharge end to oxidizing in the gas transition zone; that is, first reducing in character to avoid reoxidation of the feed material, then the oxygen in the gas mixture is progressively increased to 3 to 5% excess oxygen, thus assuring that combustion of all combustible matter is complete within the scrap heating-chamber. Since the air is injected evenly throughout the whole length of the heating zone 24 the atmosphere is changed gradually and evenly along the entire length of the heating chamber, with no dramatic change in any portion, thus maintaining even distribution of combustion to preheat the scrap. Non-metallic combustible matter in the charge is burned off, and the charge is heated to at least 500° C., and to a maximum temperature of approximately 800° to 1000° C.

Oxygen sensor 40, which is preferably a multiple gas analyzer, regulates the adjustment of combustion air injectors and/or burners and the rate of combustion in the chamber 12. Near the oxygen fuel burner 68, the heating gas composition includes about 3 to 5% excess oxygen. A small amount of air enters the gas transition zone 22 through the dynamic seal 18. This is controlled by adjustment of pressure P1 in the dynamic seal 18, pressure P2 in the gas transition zone 22, and pressure P3 in the secondary gas treating chamber. Flow of gas through the secondary gas treating chamber and pressure in the system are controlled by damper 70. When the flue gas reaches the gas transition zone, its composition includes a minimum of 3% excess oxygen.

The scrap charge enters the preheater chamber 12 on a conveyor through dynamic gas seal 18. Preheater off-gas handling equipment is connected to the chamber 12 near and above gas seal 18. The hot off gas treating system includes an elongated refractory-lined secondary combustion chamber or thermal incinerator 42, a gas passageway connecting the incinerator to the chamber 12, a waste heat boiler 50 or gas quenching unit, a fan or blower 52, a bag house 54, and associated piping. Pipe 56, which connects gas pipe 58 between the boiler and bag house, is also connected to the ventilating system 60 of the building in which the steelmaking furnace is located.

An oxygen sensor 66 is provided within the thermal incinerator to determine the fuel-oxygen ratio required by burner 68 for adding additional heat or oxygen to the off-gas entering the thermal incinerator. Burner 68 is an oxygen-fuel burner in the gas transition section to maintain both the temperature of the gas and the oxygen level within the pre-established limits.

Referring now to FIGS. 2 and 3, which depict the preferred embodiment of the charge preheater apparatus, vibrating channel 44 acts as the conveyor. The dynamic seal 18 at the material entry end of the conveyor is formed by a chamber using air to prevent escape of flue gases from the scrap heating chamber to the atmosphere at that location by admitting a certain controlled low volume of air.

The term "scrap" as used throughout this specification and claims means charge material for continuous melting, including ferrous scrap, pig iron and direct reduced iron in pellet or briquet form. Scrap may be separated by grades of purity, shredded or sheared to suitable size, if necessary for continuous feeding into the furnace, and stored by grade until required for feeding. Scrap defined as "commercial grade" by the Iron and Steel Scrap Institute (ISSI) is preferred. Pig iron is granulated or broken into appropriate size for feed stock.

Charge material is selected from the stored scrap material and other feed stock, weighed and fed onto the conveyor. The charge material is preheated in chamber 12, by passing furnace off-gas through and over it, counter-current to the flow of the charge into the furnace.

The steelmaking furnace operates continuously at full power for an extended period of time up to approximately six or seven days during which time only minor lining repairs are made to the furnace. Slag in the furnace is kept in the foaming condition during all phases of the process, including the tapping phase, and full power is maintained to the furnace during tapping. Foaming slag is caused mainly by the liberation of CO within the bath and the slag. The carbon necessary for reaction with the oxygen in the charge is injected into the slag or slag-metal interface of the bath in the form of powdered carbon or coke through one or more underbath tuyeres. If there is insufficient oxygen present in the bath, oxygen can also be injected through underbath tuyeres to effect the necessary reaction with carbon to promote a foaming slag. Carbon and/or oxygen may be injected into the bath at any time. The carbon injection and the oxygen injection promote the formation of carbon monoxide. About 70 to 75% of the CO produced in the furnace passes out of the furnace into the scrap preheating chamber as fuel in the furnace off-gas.

In order to assure that all combustion of off-gas is completed upon its exit from the preheating chamber, it is necessary to have a residence time of 2.0 seconds at a temperature of 900°–1100° C. in the secondary combustion chamber. By providing excess oxygen of 3–5% in the incineration chamber with at least 2 seconds gas residence time at 900° to 1100° C., harmful emission levels of dioxins are incinerated.

Given the presence of the necessary chemical constituents, dioxins and furans may form in the presence of catalysts, such as copper or iron, when off-gas is cooled after incineration. To prevent such formation, it is important that the gases pass through the 300°–500° C. range quickly, i.e., in the waste heat boiler or gas quencher, to lower the gas temperature rapidly below this range.

To complete the system and insure that the vast majority of emissions are treated, a building ventilation system 60 is provided to collect secondary gas emissions from the furnace and other gaseous and particulate matter from the building. Gases from the ventilation system pass through pipe 58 to pipe 56 where they are mixed with the waste heat boiler flue gases, then enter baghouse 54 through blower 52, for cleaning prior to discharge of the cleaned cooled gases to the atmosphere.

In operation, iron-bearing material and other feed materials are mixed as desired, the mixture is continuously passed through a dynamic seal into an elongated heating chamber having sequentially a feed mixture entry end, a gas transition section, a heating section and a feed mixture discharge section. An associated electric arc steelmaking furnace which is fed by the mixture of feed materials generates carbon monoxide off-gas, which is removed into the heating chamber and combusted therein. The off-gas is generated by reaction of carbon in the bath (from feed materials and/or carbon injected into the bath with oxygen injected into the bath. The heat of combustion and the sensible heat of the furnace off-gas combined heat the chamber and the mixture therein by the hot off-gases passing through and over the mixture within the chamber. A progressively changing atmosphere is maintained within the heating chamber, from reducing at the mixture discharge end to oxidizing in the gas transition section. The products of combustion and associated off-gases are removed from the gas transition section of the chamber into an associated refractory-lined secondary gas-treating chamber communicating with the gas transition section. The temperature of the removed products of combustion and associated off-gases is maintained at a temperature in the range of 900° to 1100° C. for a period of at least 2 seconds in the secondary gas-treating chamber, then cooled and discharged. The heated feed mixture is discharged continuously and directly into the associated steelmaking furnace.

When using the CO from the furnace as fuel to preheat the scrap, an excess of combustion air is introduced to the scrap preheating chamber in relation to the CO. After a few seconds, the air supply is controlled to maintain the desired excess of oxygen in the gas transition section 22. It is desirable to maintain a sufficient velocity of air to reach the top of the scrap on the conveyor.

SUMMARY OF THE ACHIEVEMENT OF THE OBJECTS OF THE INVENTION

From the foregoing, it is clear that I have invented a method and apparatus for the continuous preheating of charge materials for use in conjunction with the operation of an electric steelmaking furnace, which allows continuous preheating of scrap materials and continuous or semi-continuous charging, while avoiding the production and emission of noxious gases, while maintaining good control over both quality and product chemistry.

What is claimed is:

1. A method for the continuous preheating of charge materials for a steelmaking furnace, comprising;
   a) continuously passing a preselected feed mixture of iron-bearing material and other feed materials through an elongated heating chamber having sequentially a feed mixture entry end, a gas transition section, a heating section and a feed mixture discharge section having a discharge end;
   b) establishing a dynamic seal at the feed mixture entry end of the heating chamber;

c) heating the chamber and the feed mixture therein by passing hot gases through and over the feed mixture within the chamber, and combusting said gases to form combusted gases and associated off-gases, and to preheat the feed mixture;

d) maintaining a change of oxygen concentration in the combusted and associated off-gases within the heating chamber from reducing at the mixture discharge end to slightly oxidizing to said feed mixture in the gas transition section;

e) removing the combusted gases and associated off-gases from the gas transition section of the chamber;

f) maintaining the temperature of said combusted and associated off-gases remove from said gas transitions at a temperature in the range of 900° to 1100° C. for a period of at least 2 seconds; and g) discharging the feed mixture continuously and directly into a steelmaking furnace.

2. A method according to claim 1, wherein the hot gases passing through and over the mixture are hot reacted gases formed in a steelmaking furnace.

3. A method according to claim 1, further comprising providing auxiliary fuel throughout the elongated heating chamber to increase combustion therein.

4. A method according to claim 1, wherein the hot gases contain a high percentage of carbon monoxide upon introduction to the heating chamber.

5. A method according to claim 1 wherein said feed mixture contains both metallic and non-metallic materials.

6. A method according to claim 5 wherein the metallic materials in said feed mixture are selected from the group consisting of iron-bearing scrap in shredded, sheared or granular form, direct reduced iron, commercial scrap, or a mixture thereof.

7. A method according to claim 1 wherein said mixture is preheated to at least 500° C. prior to discharge from the elongated heating chamber.

8. A method according to claim 1, wherein the progressively changing oxygen concentration within the heating chamber is achieved by controlled introduction of air throughout the length of the heating chamber.

9. A method according to claim 1, further comprising monitoring the combusted and associated off-gases in the gas transition section and adjusting the oxygen concentration to maintain an excess of 3 to 5 percent oxygen in said combusted and associated off-gases removed from the transition section.

10. A method according to claim 9, wherein adjusting the oxygen concentration is accomplished by adjusting injection of air throughout the length of the chamber.

11. A method according to claim 9, wherein adjusting the oxygen concentration is accomplished by oxygen-fuel injection into the gas transition section, and controlling the oxygen concentration thereby.

12. A method according to claim 1, further comprising monitoring the temperature of the combusted and associated off gases removed from the gas transition section and maintaining said temperature at removal in the range of 900° to 1100° C.

13. A method according to claim 12 wherein said temperature is maintained by combusting an oxygen-fuel fluid in the gas transition section.

14. A method according to claim 1, further comprising rapidly cooling the removed combusted and associated off-gases to a temperature below 300° C.

15. A method according to claim 2, further comprising increasing the hot reacted gases from scrap heating by injection of oxygen into the steelmaking furnace.

16. Apparatus for the continuous preheating of charge materials for an associated steelmaking furnace, comprising:

a) conveyor means, having a charge material entry end and a material discharge end;

b) support means for said conveyor means;

c) a cover over a portion of said conveyor means, forming a heating chamber with said support means, said heating chamber comprising sequentially a gas transition zone, a heating zone, and a feed mixture discharge zone;

d) gas seal means at the material entry end of said conveyor means to the heating chamber;

e) means for connecting and sealing the heating chamber to a steelmaking furnace;

f) means for introducing heat to the interior of said heating chamber;

g) means for removing off gases at the material entry end of said heating chamber; and h) means for heating removed off gases to a high temperature in the range of 900° to 1100° C. and for holding said temperature for a period of at least 2 seconds.

17. Apparatus according to claim 16 wherein said conveyor means is a vibrating channel.

18. Apparatus according to claim 16 wherein said associated steelmaking furnace has a gas discharge opening communicating with said discharge zone for introducing hot furnace off-gases from said furnace to the interior of said heating chamber.

19. Apparatus according to claim 16 further comprising means for providing auxiliary heat to the interior of said chamber, comprising at least one burner positioned in said cover.

20. Apparatus according to claim 16 further comprising means for controlling the temperature within said chamber.

21. Apparatus according to claim 16 further comprising means for evenly distributing combustion air throughout said chamber.

22. Apparatus according to claim 16 further comprising means for maintaining a progressively changing atmosphere within the heating chamber from reducing at the material discharge end to oxidizing in the gas transition zone.

23. Apparatus according to claim 16 further comprising a building containing said apparatus and means for collecting emissions from said furnace and said building, and means for conducting said emissions to a location for cleaning.

24. Apparatus according to claim 16 wherein said gas seal means is a dynamic seal chamber including means for creating a negative pressure therein, and associated means for controlling the amount of air entering the gas transition zone from the dynamic seal.

25. Apparatus according to claim 16, further comprising an associated refractory-lined secondary gas-treating chamber communicating with the gas transition zone at the charge material entry end of said heating chamber for thermal incineration of combustible residual matter.

26. Apparatus according to claim 25, further comprising means for controlling the amount of oxygen in the gas in said secondary gas treating chamber.

27. Apparatus according to claim 26, wherein said means for controlling the amount of oxygen in the gas in said secondary gas treating chamber comprises an oxygen sensor mounted in said secondary gas treating chamber, and an oxygen-fuel burner mounted in said gas transition zone opposite said secondary gas treating chamber, responsive to said sensor.

28. Apparatus according to claim 16 further comprising means for rapidly cooling removed off gases following incineration.

29. Apparatus according to claim 16 wherein said apparatus is sufficiently gas-tight to avoid leakage of flue gas while controlling air intake.

* * * * *